United States Patent [19]
Rushmeier et al.

[11] Patent Number: 5,974,168
[45] Date of Patent: Oct. 26, 1999

[54] ACQUIRING BUMP MAPS FROM CURVED OBJECTS

[75] Inventors: Holly Edith Rushmeier, Mt. Kisco; Gabriel Taubin, Hartsdale; Andre Pierre Gueziec, Mamaroneck, all of N.Y.

[73] Assignee: International Business Machines Corporation, Armonk, N.Y.

[21] Appl. No.: 09/061,564

[22] Filed: Apr. 16, 1998

[51] Int. Cl.$^6$ .............................. G06K 9/00; G06K 9/46
[52] U.S. Cl. .................... 382/141; 382/154; 382/190
[58] Field of Search ..................... 382/141, 154, 382/100, 103, 104, 108, 106, 151, 153, 169, 174, 190, 191, 195, 276; 364/513, 413–415, 560–563; 358/102, 403

[56] References Cited

U.S. PATENT DOCUMENTS

| 4,488,173 | 12/1984 | DiMatteo et al. | 358/107 |
|---|---|---|---|
| 4,873,651 | 10/1989 | Raviv | 364/512 |

OTHER PUBLICATIONS

"Fitting Smooth Surfaces to Dense Polygon Meshes", V. Krishnamurthy and M. Levoy, Computer Graphics Proceedings, Annual Conference Series, 1996.

"Photometric Method for Determining Surface Orientation from Multiple Images", R.J. Woodham, pp. 513–531.

"A Theory of Photometric Stereo for a Class of Diffuse Non–Lambertain Surfaces", H.D. Tagare, IEEE Transactions of Pattern Analysis and Machine Intelligence, vol. 13, No. 2, Feb. 1991.

"Modeling the Mighty Maple", Jules Bloomenthal, SIGGRAPH '85, vol. 19, No. 3, San Francisco, Jul. 22–26, 1985.

"Object Representation in Computer Vision II", J. Ponce, A. Zisserman and M. Herbert (Eds.), ECCV '96 International Workshop, Cambridge, U.K., Apr. 13–14, 1996 Proceedings.

"Piecewise Surface Flattening for Non–Distorted Texture Mapping", C. Bennis, J–M. Vezien & G. Iglesias, Computer Graphics, vol. 25, No. 4, Jul. 1991.

*Primary Examiner*—Jose L. Couso
*Assistant Examiner*—Duy M. Dang
*Attorney, Agent, or Firm*—Jay P. Sbrollini, Esq.; Perman & Green, LLP

[57] ABSTRACT

A method and system for obtaining and processing acquired images of an object to extract a small scale geometry (a bump map) of the object that is independent of object curvature. The method includes steps of (a) operating N (where N>3) light sources and an image input device placed at a distance from the object such that different regions of the object are illuminated by each of the multiple light sources; (b) obtaining multiple images of the object, one for each of the light sources with the other light sources turned off; (c) processing the images to derive three images, each corresponding to a component of surface normals of the object relative to directions to three of the light sources; (d) removing an effect of large scale surface shape from the derived images of the surface normals by computing low spatial frequency images from the derived images; (e) for a section or sections of the images for which the small scale geometry is to be acquired, determining transformations from the surface normals represented by the low spatial frequency images to the normals of a planar surface; (f) applying the transformations to the derived surface normal images to obtain the normals of the small scale surface variations applied to a flat plane; (g) adjusting a spacing of the values for the normals to account for foreshortening due to curvature by expanding the distances using directional derivatives computed from the surface normals at each point in the image; and (h) obtaining regularly spaced images of new surface normals by sampling the spatially adjusted images onto a new, regularly spaced image.

17 Claims, 8 Drawing Sheets

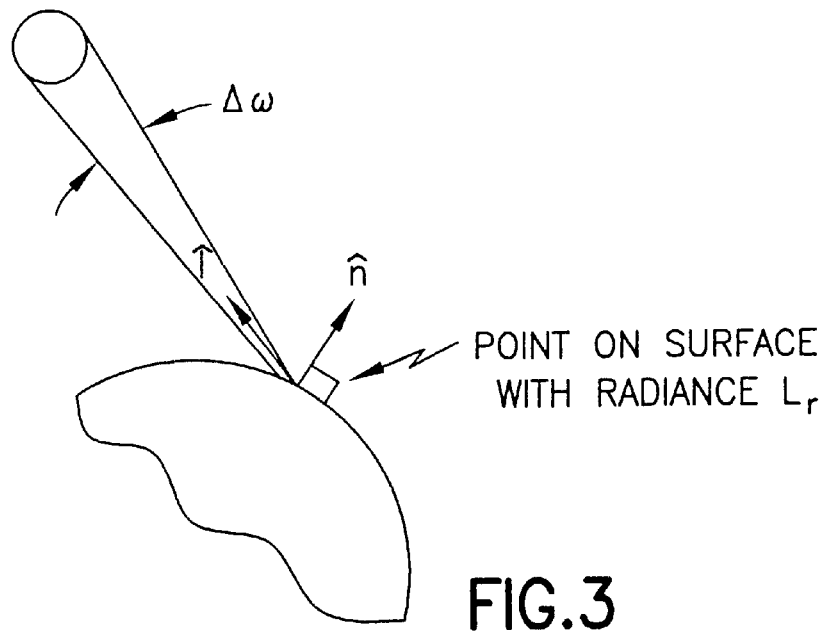
FIG.3
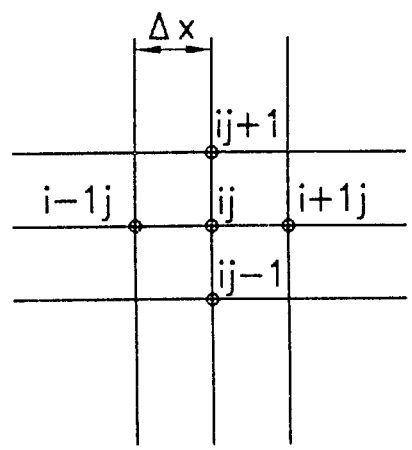
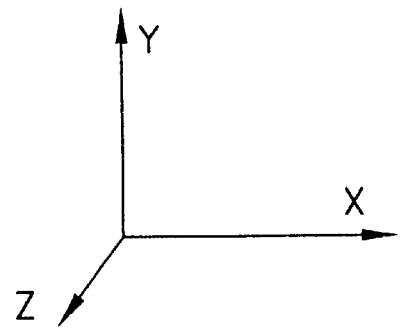
FIG.5

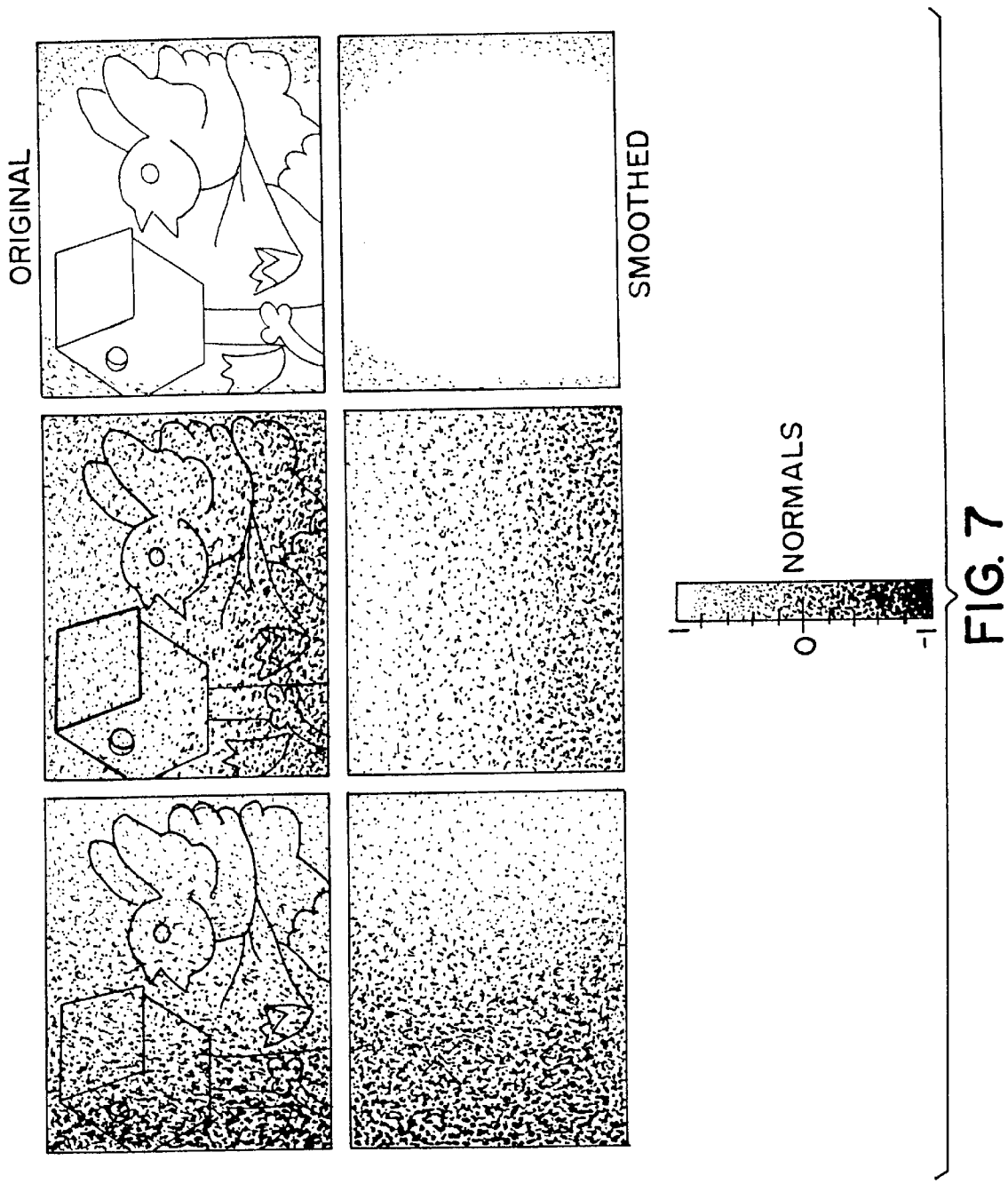

IMAGES 231-233
ORIGINAL

IMAGES 241-243
SMOOTHED

IMAGES 251-253
CURVATURE SHAPING
REMOVED

IMAGES 261-263
STRETCHED TO
FLATTEN

ACQUIRING BUMP MAPS FROM CURVED OBJECTS

FIELD OF THE INVENTION

This invention relates to the fields of computer vision, computer graphics and computer aided design.

BACKGROUND OF THE INVENTION

There are various conventional scanning systems that can be employed to acquire the geometry of an object. Typically, a system acquires the entire geometry, without separating out the large scale shape of the object and the small scale surface variations. However, the small scale surface variations, such as small bumps and ridges, form a geometric texture that alters the appearance of the large scale shape. For example, small bumps on an orange peel differentiate the appearance of an orange from that of a smooth ball.

In computer graphics such small scale surface variations can be represented as "bump maps". Bump maps are used to store a complex geometry at a physical scale between explicit geometry representation and surface microscale effects as encapsulated in a bidirectional reflectance distribution function (BRDF). A bump map contains an array of normals that are applied as perturbations to a base geometry, and are most frequently defined procedurally.

Two conventional methods for capturing bump maps for curved objects have been developed. One method is to flatten the object, X-ray it, generate a height map from the X-ray, and then compute surface normals from the height map. The other method uses 3-d scanning techniques from computer vision methodologies to acquire a detailed triangle mesh representing the object, and then uses surface normals computed from the mesh to represent the bump map. In this case the bump map only exists for the curved object, and the normals only apply to objects with the original curvature.

In computer vision, surface normals are obtained directly from objects using variations of photometric stereo. However, these normals include the effect of the large scale geometry of the object, as well as the small scale surface variations.

Prior art systems for acquiring bump maps either require altering the original object, such as by flattening the object, or producing maps that are specific to the original large scale geometry. These techniques cannot be applied for objects that cannot be altered, such as existing artwork.

Also, prior art systems involving X-ray or 3-d scanning systems for detailed geometry acquisition are expensive and require a trained operator to use. In the case of 3-d scanning systems complex software is needed to form the detailed 3-d surface, and subsequently compute the surface normals.

It is further noted that for computer vision techniques it is known to obtain a "shape from" various lighting effects, such as shape from shading and shape from specularity. Researchers have also explored the area of "appearance based matching." In particular, various researchers have sought illumination basis images that can be used to construct an image of an object under arbitrary lighting conditions.

Epstein et al. in "Learning Object Representations from Lighting Variations", ECCV 96 International Workshop, pgs. 179–199 (April 1996) us ed the idea of illumination basis images to develop methods for obtaining an object's shape from lighting variations. These authors addressed the general problem of obtaining an object's geometry given a series of images of the object under unknown illumination conditions.

Other researchers have addressed the problem of obtaining input for rendering using inexpensive equipment. One approach measures anisotropic reflectance using a CCD camera, a quartz-halogen lamp, and a diffuse reference standard. Another approach re-renders the appearance of an object for fixed lighting conditions from a large series of video images, while another approach obtains texture maps from non-planar shiny objects using a series of video images.

OBJECTS AND ADVANTAGES OF THE INVENTION

An object and advantage of this invention is an improved apparatus and method for acquiring bump maps from curved objects.

A further object and advantage of this invention is to provide apparatus and methods for acquiring bump maps in a form that is independent of the large scale geometry of the original object, such that the maps can be applied to newly designed object geometries.

SUMMARY OF THE INVENTION

The foregoing and other problems are overcome and the objects are realized by methods and apparatus in accordance with embodiments of this invention.

The teaching of this invention provides a system and method for processing acquired images of an object to extract the small scale geometry of the object independent of object curvature. The invention uses multiple light sources and an image input device placed at a distance from the object such that different regions of the object are illuminated by each of the multiple light sources. Multiple images are then taken with the input device, one for each of the light sources with the other light sources turned off. The images are processed to produce three images, each corresponding to a component of the surface normals.

In order to remove the effect of large scale surface shape from the derived images of the normals a low spatial frequency portion of the derived normal images is computed. For a section or sections of the images for which the small scale geometry is to be acquired, the transformations are found from the normals represented by the low spatial frequency images to the normals of a planar surface. These transformations are applied to the original derived surface normal images to obtain the normals of the small scale surface variations applied to a flat plane. These images of the normals for small scale variations are referred to herein as bump maps. The spacing of the values for the normals is adjusted to account for foreshortening due to curvature by expanding the distances using directional derivatives computed from the surface normals at each point in the image. Regularly spaced images of the new normals are obtained by sampling the spatially adjusted images onto a new, regularly spaced image.

The teaching of this invention beneficially provides apparatus and method for capturing small scale surface geometry variations from an existing object in a form that can be applied, using computer graphics techniques, to new geometries in, for example, a computer-aided design system. By example, an acquired small scale geometry from a natural object such as tree bark, from an existing art work such as a cameo, or from a manufactured object such as knitwear, can be used as a design element in new products such as, by example, decorative ceramics and architectural trims.

Stated in another way, a system in accordance with this invention acquires a description of surface geometry by taking multiple images of an object from one input device viewpoint using multiple light source positions. For each image pixel, the highest and lowest grey level values are discarded, and the surface normal is computed. Three images are derived, one for each of the components of the surface normal. The low spatial frequency portion of each of the three derived images is computed. The transformations from the low spatial frequency normals to the normals for a plane are then determined and are applied to the original derived normal images to form a representation of the normals for the small scale surface variations. The spacing between pixel centers in the image is expanded using the information from the normals to account for surface curvature. The flattened map of normals for the small scale surface variations can then be applied to new geometries in, for example, a CAD system. The system further allows an existing object to be re-rendered with new lighting and surface finish without explicitly reconstructing the object geometry.

BRIEF DESCRIPTION OF THE DRAWINGS

The above set forth and other features of the invention are made more apparent in the ensuing Detailed Description of the Invention when read in conjunction with the attached Drawings, wherein:

FIG. 3 is a diagram that is useful in explaining the teaching of this invention, and which shows the geometry of light reflectance using symbols defined in Equation 1.

FIG. 5 is a diagram depicting a portion of an image, and is useful in explaining an adjustment of spacing between pixels.

FIG. 7 illustrates, for the object of FIGS. 6A–6E, the computed surface normal directions for original and smoothed (filtered) images.

DETAILED DESCRIPTION OF THE INVENTION

Figure 1:
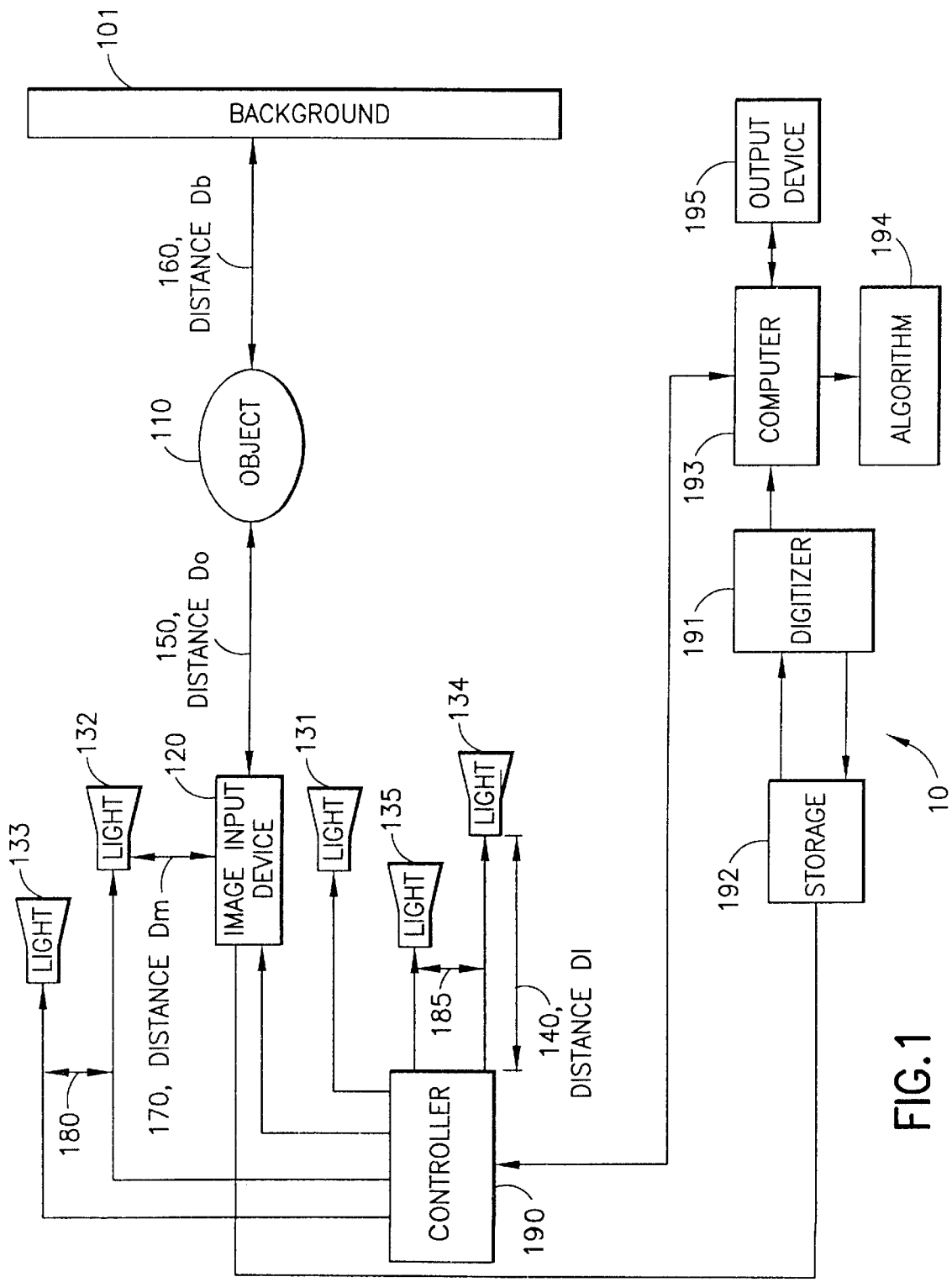
FIG. 1 is a block diagram of a presently preferred embodiment of apparatus for acquiring bump maps in accordance with the teachings of this invention.

Before describing the teaching of this invention it will be instructive to briefly review the approach of Epstein et al. that was referred to above. Their technique for obtaining surface geometry from lighting variations begins with a simple model for the reflected radiance from a point on a surface. Referring to FIG. 3, and assuming a Lambertian surface illuminated by a distant small source, the reflected radiance $L_r$ is given by:

$$L_r = p(L_o \Delta w/\pi) \hat{n} \text{dot } \hat{l} \quad (1)$$

where p is the Lambertian reflectance, $L_o$ is the light source radiance, $\Delta w$ is the solid angle subtended by the light source, $\hat{n}$ is the surface normal, and $\hat{l}$ is the direction to the light source.

Assume that there are three images of the object from the same view point, for three different light sources, and further assume that each source has the same radiance, subtends the same solid angle, and that the directions to all the sources are known. The images give three relative values for the reflected radiance $\alpha L_{r,1}$, $\alpha L_{r,2}$, $\alpha L_{r,3}$. The values are relative (with an unknown scaling factor $\alpha$, assuming approximately linear camera response) because the images are captured with a digital (grey scale) value of 0 to 255, rather than with a value representing an absolute radiance. One can then form the following matrix equation for the surface normals $\hat{n}$:

$$p(L_o \Delta w/\pi) \begin{vmatrix} l_{1,1} & l_{1,2} & l_{1,3} \\ l_{2,1} & l_{2,2} & l_{2,3} \\ l_{3,1} & L_{3,2} & L3,3 \end{vmatrix} \begin{vmatrix} n_1 \\ n_2 \\ n_3 \end{vmatrix} = \begin{vmatrix} \alpha L_{r,1} \\ \alpha L_{r,2} \\ \alpha L_{r,3} \end{vmatrix} \quad (2)$$

This allows one to solve for $(pL_o \Delta w/\alpha\pi)\hat{n}$. Since the magnitude of $\hat{n}$ is one, from this result can be obtained the normal vector $\hat{n}$ and a value $p_{rel} = pL_o \Delta w/\alpha\pi$ proportional to the reflectance p. Repeating this calculation for all visible points on the surface (i.e. for all pixels) results in estimates for the surface normal and relative reflectance $p_{rel}$. This approach is known as conventional photometric stereo.

However, there are two well-known problems with traditional photometric stereo. First, there will be some points that will be in shadow for one or more of the images. That is, there will not always be three non-zero values of $L_r$ to use in solving Eq. 2. Second, surfaces are not truly Lambertian and can have a specular component. That is, Eq. 1 may not be a suitable model for the reflected radiance. The computer vision literature has many approaches to deal with aspects of these problems.

For the problem of shadows, Epstein et al. identify two types of shadows, i.e., attached and cast. Points lie in attached shadows when their surface normal has a dot product of less than zero with the light source direction. Points lie in cast shadows when another part of the object blocks the light source.

If one could determine when a point was in an attached rather than cast shadow, then information would be obtained about the surface normal. However, since one cannot differentiate between shadow types in the image, and in accordance with an aspect of this invention, all pixel values with low value of $\alpha L_r$ are eliminated from the calculation, and thus more than three images of an object of interest are required.

For surfaces with a specular component Epstein et al. note that the highlights resulting from specular reflection have very high values of $\alpha L_r$. By excluding very high pixel values, specular effects can be eliminated from the calculations. A similar approach is known from the prior art to eliminate specular highlights, by taking the mode of the color values recorded for a particular point on a surface to recover a texture map.

Epstein et al. go on to consider the problem of recovering geometry from the surface normals given various assumptions, and the general problem of recovering shape when the illumination in each image is not known. They show results for various cases for the problem of capturing the geometry of faces.

However, the inventors have considered a different problem, i.e., the design of a system for capturing bump maps using the basic idea expressed in Eq. 2, and discarding high and low pixel values to avoid specular highlights and shadows. In addition to applying the system to relatively large scale geometries, it is also possible to use the system for finer scales such as quilting and tufting on surfaces.

Reference is now made to FIG. 1, which is a block diagram that shows a preferred embodiment of a system 10 for acquiring bump maps in accordance with the teaching of this invention. The system 10 is operated to capture the data required for producing bump maps for a wide range of objects with a variety of surface reflectance properties, cast shadows, and small scale surface detail.

The system 10 includes an image input device 120 that develops an image of a scene that includes a background 101 and an object 110. The background 101 is preferably a non-reflective matte surface such as black felt. The image device 120 is located at a horizontal distance Do 150 from the object 110. The object 110 is a minimum horizontal distance Db 160 from the background 101. The object 110 is illuminated by five light sources 131, 132, 133, 134 and 135. The lights 131, 132, 133, 134 and 135 are positioned the horizontal distance Do 150 from the object. One light 131 is attached to the image input device 120 and lies on the input device view direction, while the lights 132, 133, 134, 135 lie at about 45 degrees to the view direction. Two lights 132 and 133 are located a vertical distance Dm 170 above the input device 120. The distance 180 between the lights 132 and 133 is equal to twice the vertical distance 170, and the distance of each light 132 and 133 to the object 110 is the same. Two lights 134 and 135 are located a vertical distance Di 170 below the input device 120. The distance 185 between the lights 134 and 135 is twice the distance 170, and the lights 134 and 135 are located the same distance from the object 110. The lights 131, 132, 133, 134 and 135 and the image input device 120 are controlled by a controller 190 that switches the lights 131, 132, 133, 134, 135 on and off so that the image input device 120 obtains an image of the object 110 illuminated by a single light. The images are stored in a storage device 192, and are fed to a digitizer 191 which is connected to a computer 193 which runs an algorithm 194. The system 10 also includes an output device 195 that allows a user to manually select the portions of the acquired images that will be used in the algorithm 194.

The input image device 120 can be a video camera, a charged coupled device camera (CCD), or any other known device for generating images, and is preferably sensitive to visible light. One suitable embodiment of the image input device 120 is a device known as a Sony XC-999 color video camera module.

The lights 131, 132, 133, 134 and 135 can be any source of visible light of a size dictated by the horizontal distance 150 to the object 110. The diameter of the lights 131, 132, 133, 134 and 135 is preferably less than 20 percent of the distance 150 to provide a spatially uniform illumination across the object 110. One suitable light source for use with an object 110 of diameter 5 inches with a horizontal distance 150 of 25 inches is a 25 watt, 210 lumen tungsten filament bulb that is approximately 2.5 inches in diameter.

The controller 190 switches the lights 131, 132, 134 and 135 on and off and triggers the image input device 120 by any suitable means, e.g. a fixed interval timer, or a manual switch. One suitable embodiment of the controller 190 is a set of manual switches for switching on the lights 131, 132, 133, 134 and 135 one at a time, and triggering the input device 120 after each light is switched on. Electrically controlled switches or relays can also be employed.

The object 110 can be any object that is to be imaged, and should be capable of reflecting visible light back to the input device 120. Examples include natural objects such as tree bark or fruit, or manufactured objects such as a vase with an embossed pattern.

One feature of this invention is the distances between the five lights 131, 132, 133, 134 and 135, the imaging device 120 and the object 110. The first light 131 is located coincident with the imaging device 120 so that one image is acquired with the entire object 110 illuminated. The other four lights 132, 133, 134, 135 are positioned to illuminate distinctively different regions of the object 110, while avoiding grazing angles of incidence for which the reflectance of many objects increases dramatically relative to the reflectance at normal incidence. The placement of the four lights 132, 133, 134, 135 also avoids large angles between the lights and features on the object 110 that would produce large cast shadows resulting in low grey level pixel values for points on the object 110. The horizontal distance 150 is determined relative to the size of object 110 to be imaged to insure that the lights can be placed far enough away such that the $1/d^2$ decrease in energy flux density from the lights 131, 132, 133, 134, 135 results in a small variation of illumination across the object 110. A general rule is that to image an object 110 of diameter D, the light sources 131–135 are at a distance of at least 5D away. The light sources 131, 132, 133, 134, 135 are sized to be small enough relative to the horizontal distance 150 to insure that all shadows are sharp, and so that grey level variations in the image can be attributed to surface orientation rather than to the partial visibility of a light source.

The system 10 is intended to be used in an environment where the lights 131, 132, 133, 134 and 135 are the major sources of illumination. A preferred placement of the system 10 is in a closed, windowless room to avoid any stray illumination from adding to the image pixel values.

The digitizer 191 is used to convert the images from the imaging device 120 into an array of numbers in a known manner. The digitizer 191 can be located before memory storage 192, in the computer 193, or anywhere between the image input device 120 and the computer 193. If the imaging input device 120 is a digital camera, then a separate digitizer may not be required. The digitizer 191 may be separate from or may be a part of the computer 193. Note that the image may be stored in computer memory as well as in the storage device 192, and that the storage device 192 may be a part of the computer memory, such as a fixed disk.

The system also includes the output device 195. The output device can be a video display, printer, photoprocessor, image processing device or any output devices known in the art. The output device 195 can be used to provide the user with a visual display of the object 110 with each of the various lights 131, 132, 133, 134 and 135 illuminated. The output device 195 may also provide the user with control functions by which the user can display alternative images, operate the system 10, or reconfigure the system 10 (e.g. changing the gain, focus, or aperture used by the image input device 120). The output of the system 10 may also form the input for some further stage of processing, such as cropping the images to acquire data for only a portion of the object 110.

Figure 2:
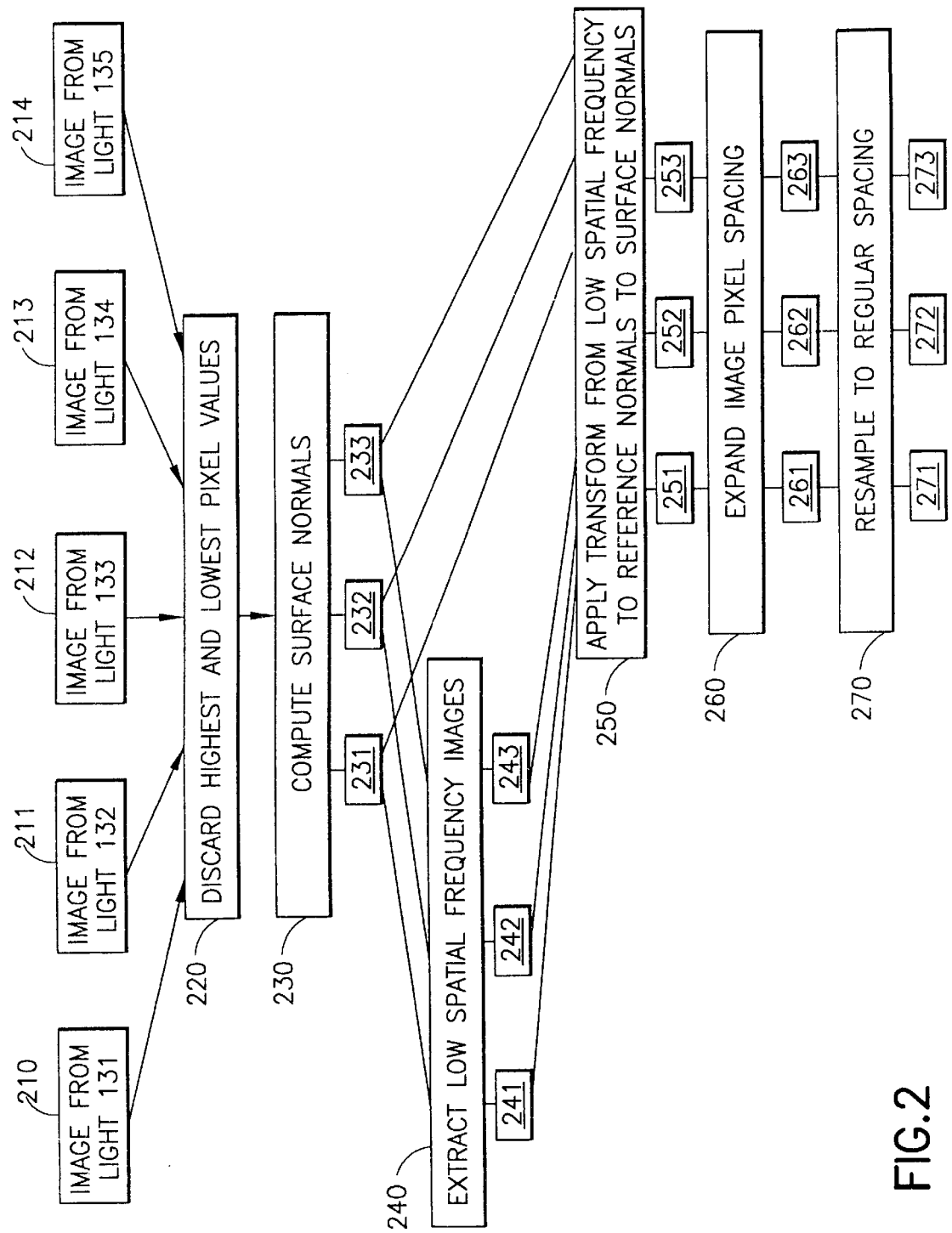
FIG. 2 is a logic flow diagram of a method executed by the computer of FIG. 1 running a program in accordance with this invention.

FIG. 2 is a flow chart showing the steps of a preferred method that is performed by the computer 193 using the algorithm 194 embodied as software.

In step 210, an image (first image) of the scene is produced with the light 131 switched on to illuminate the object 110, while the lights 132, 133, 134, and 135 are switched off. In step 211, a second image is produced with the light 132 switched on to illuminate the object 110 while the lights 131, 133, 134, 135 are switched off. In steps 212, 213 and 214 third, fourth and fifth images are produced successively by switching on lights 133, 134, 135 in turn with all other lights off. By performing these steps the object surface normals can be determined even for objects with cast shadows and specular highlights.

The order of acquiring the images may be reordered in any permutation. That is, any of the images 210, 210, 212, 213 or 214 may be the first image.

The object 110, the background 101, and the image input device 120 should all be at the same locations in steps 210, 211, 212, 213 and 214 to assure that the five images are in spatial registration.

That is, assume that each image pixel is numbered starting from the upper left corner of the image, then proceeding across the first line, then down to the left edge of the second line. Registration in this sense means that each numbered pixel in the first image corresponds to the same area of the scene as the identically numbered pixel of the second image. Proper registration can be ensured by either acquiring the five images in quick succession, or by imaging a stationary object against a stationary background.

In step 220 the first, second, third, fourth and fifth images are digitized by the digitizer 191 (if not already in digital form). In the computer 193, the grey level values for each and every pixel in the first, second, third, fourth and fifth images are sorted. Any suitable sorting algorithm can be used to determine the ordering of the pixel values by grey level. The conversion of red, green and blue values to grey level, if the input device is a color camera, is also performed in a known fashion. A rule is then used to determine valid grey levels for that pixel that excludes grey levels that represent specular highlights or shadows. A preferred rule is that for each pixel, the highest and lowest grey level values are discarded, and a record is made of the lights 131–135 that correspond to the three values that are retained. An alternative rule is to discard any values that are above and below a grey level that is specified by the user, or that is selected from a histogram of all grey values in the images.

In step 230 the positions of the lights (131, 132, 133, 134, and/or 135) corresponding to the grey level values that have been retained for each pixel, relative to the object 110, are used to compute unit vectors from the object 110 in the direction of each of the lights. The unit vectors and the three grey level vectors are used to form a system of equations for a vector in the direction of the surface normal. This can be accomplished using known techniques in the image processing field. The resulting vector is then normalized to produce the surface unit normal. Three new images 231, 232, 233 are then formed such that, for each pixel location, the first component value is stored in image 231, the second component value is stored in image 232, and the third component value is stored in image 233.

In step 240 low spatial frequency images 241, 242 and 243 are computed for each of the images 231, 232 and 233, respectively. The appropriate spatial frequencies to filter out are determined by the spatial frequencies of the small scale features to be obtained by any suitable filtering techniques, such as fast Fourier transforms (FFTs) or convolution with Gaussian filters.

In step 250, three flattened images 251, 252 and 253 are formed by finding pixel-by-pixel transformations from the normals represented in images 241, 242 and 243 to a set of normals representing a planar surface. The transformation of vectors from one coordinate system to another can be accomplished using techniques known in the image processing art. The transformation for each pixel thus obtained is applied to the images 231, 232 and 233 to form a set of transformed flattened images 251, 252 and 253 that represent the surface normals without large scale object curvature.

In step 260, the flattened images 251, 252, and 253 are expanded spatially into images 261, 262, 263 to account for foreshortening in the image due to large scale object curvature. The spacing between pixels in the image is expanded using directional derivatives, at each pixel, computed from the surface normals.

In greater detail, and referring to FIG. 5, the image is represented as an array of points with indices ij indicating column and row, and a coordinate system can be defined with x in the direction of increasing i, y in the direction of increasing j, and z coming out of the page.

Because the image is captured with a version of photometric stereo, it can be guaranteed that the approximate smooth curved underlying surface can be represented by the function z(x,y), and that the surface has surface normals in the z direction that are always greater than zero.

For a point in the image representing the smooth curved surface:

$l_{ij}m_{ij}n_{ij}$ is the normal of the blurred (i.e., filtered) surface;

$\Delta x$ is the spacing between grid points in both the x and y directions;

$x_{ij}y_{ij}z_{ij}$ is the location of a point on the blurred surface, where $x_{ij}$ and $y_{ij}$ are known, and $z_{ij}$ is not;

$\partial z/\partial x|_{ij}$ and $\partial z/\partial y|_{ij}$ are the directional derivatives of the surface; and $d_{ij,i+1j}$ and $d_{ij,ij+1}$ are the distances between grid locations ij and i+1j, and ij and ij+1, respectively.

The directional derivatives are approximated by the surface normals as:

$$\partial z/\partial x|_{ij} = l_{ij}/n_{ij} \text{ and } \partial z/\partial y|_{ij} = m_{ij}/n_{ij}.$$

Using these directional derivatives, the distances between neighboring points can be approximated from:

$d_{ij+1j} = \Delta x + \partial z/\partial x|_{ij}\Delta x$; and $d_{ij,ij+1} = \Delta x + \partial z/\partial y|_{ij}\Delta x$.

To stretch out the surface the algorithm seeks to find new points $x'_{ij}$, $y'_{ij}$, z'=constant for all ij that preserve distance. This can be found by any of the existing methods that adjust the original positions $x_{ij}y_{ij}$ so that the following two equations are satisfied for each point ij:

$(x'_{ij} - x'_{i+1j})^2 + (y'_{ij} - y'_{i+1j})^2 = d_{ij,i+1j}^2$; and $(x'_{ij} - x'_{ij+1})^2 + (y'_{ij} - y'_{ij+1})^2 = d_{ij,ij+1}^2$.

A suitable example of a method that produces an approximate solution to this set of equations is described in section 2.2 of an article entitled "Piecewise Surface Flattening for Non-Distorted Texture Mapping", by C. Bennis et al., Computer Graphics, Vol. 254, No. 4, July 1991, pp. 237–246.

Returning to FIG. 2, in step 270 the irregularly spaced images 261, 262 and 263 are re-sampled onto regularly spaced images 271, 272, 273. The images 271, 272 and 273 thus represent the surface normals for the small scale surface details in the original object 110, and are in a suitable form for applying to new geometries defined by a CAD system using known types of methods.

Having thus described the teaching of this invention, a consideration will now be made of several aspects of the system operation, as well as of additional details of certain of the foregoing method steps.

The most difficult surfaces are those with a medium sized reflectance lobe in the specular direction. Narrow specular peaks are eliminated by discarding high pixel values. Wide lobes, such as those corresponding to roughened magnesium oxide at a wavelength of 0.5 microns, can be sampled at approximately uniform values by avoiding grazing angles and excluding high and low values. However, surface BRDFs with medium sized lobes such as those encountered for roughened aluminum at 0.5 microns will give less than optimum results using the lighting variation method.

The size of the highlights caused by directional reflections depends both on the width of the lobe in the BRDF and on the solid angle subtended by the light source. The area of an object that will be affected by directional reflections can be decreased by decreasing the size of the light source. It is thus desirable to use the smallest light source possible that still provides adequate illumination to capture an image.

In general, all shadows are undesirable for the surface measurements. Even for gently sloping, nearly flat surfaces, at lighting angles near grazing there will be cast shadows of significant size. As in the case of BRDF variations, reducing cast shadows calls for avoiding lighting directions that are near perpendicular to the camera view direction.

However, for nearly flat surfaces, minimizing the angle between the light source and the view angle will increase the likelihood of having specular highlights. While it is desirable to have one light nearly co-located with the image input device 120, the other lights are preferably spread out to strike a balance of being not too near to the viewing angle, while not being too near to perpendicular to the viewing angle.

The system 10 shown in FIG. 1 takes into account the factors just discussed. First, five light positions are provided, which yields five image values from which one can discard the high and low pixel values and compute the normal from the remaining three values. One light source 131 is placed next to the camera 120, and the other four light sources are placed as near as possible to 45 degrees to the camera view direction. By example, the lights 131–135 can be placed about 35 inches from the object 110, allowing the system to capture objects of up to about seven inches in diameter.

The algorithm 194 for processing the captured images has three basic portions: (a) a system for image cropping, filtering, thresholding and conversion to grey scale; (b) a program for calculating the normals and relative reflectance map; and (c) a viewer for looking at the resulting bump maps with different light directions.

The initial images may need to be cropped to include only the object of interest. A median filter can then be used to remove random pop noise in the images. A threshold value can be manually determined to remove the non-zero pixel values for the background 101. Finally, the images are converted to grey scale. The cropping and threshold value can be determined interactively for one of the captured images using, for example, a system known as the IBM Visualization Data Explorer (DX). The remaining captured images can then be processed by the same program with the same settings.

An example of pseudo-code for calculating the normals is shown below.

Compute inverse matrices M[i] [j] [k] for unique combinations of three light directions i, j, k;

```
For each image pixel (
    Sort the 5 values I₁ ... I₅ into the list I'₁ ... I'₅
        and create the list L'₁ ... L'₅ of the indices
        of the associated light sources;
    If (I'₂, I'₃, I'₄) are not equal to zero(
        [N'₁, N'₂, N'₃] = M[L'₂] [L'₃ ]
```

-continued

```
        [L'₄] * [I'₂, I'₃, I'₄];
        P_rel = magnitude [N'₁, N'₂, N'₃];
        n = [N'₁, N'₂,N'₃]/P_rel
        )
    Else(
        P_rel – 0;
        n = [0., 0., 0.];
        )
)
```

To calculate the normals, the matrix in Eq. 2 is inverted. Since there are only five light source directions from which three are chosen, there are only 10 unique matrices to invert, and these are computed first. Next the program processes each pixel location. The five values are sorted, and the middle three values are chosen, thereby discarding the lowest and highest pixel values. If all retained values all non-zero, the normal and relative reflectance are computed. If the retained values are not all non-zero, a normal cannot be computed, and there will be a "hole" in the final result.

Finally, the results can be observed on a display monitor. The program takes the computed normals and produces an image from the dot product of the normals and a selected light direction. Various options for closing holes where there was insufficient data can also be examined. For example, for small one or two pixel holes applying a median filter to the bump map effectively fills in the missing values. A relative reflectance map can also be displayed. By scaling any of the captured images so that the relative RGB values are maintained, but the grey level is given by the relative reflectance map, a flattened texture map of the object can be obtained. That is, pixel values R'G'B' for pixel n in the flattened map are given by:

$$[R^1,GF^1,B^1]_n = p_{rel,n}[R,G,B]_n/\text{greylevel}([R,G,B]_n)$$

Figure 4A:
FIGS. 4A–4E illustrate a set of five captured images of a textile.
Figure 4B:
Figure 4C:
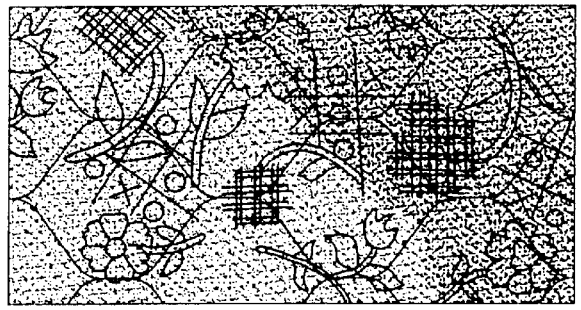
Figure 4D:
Figure 4E:
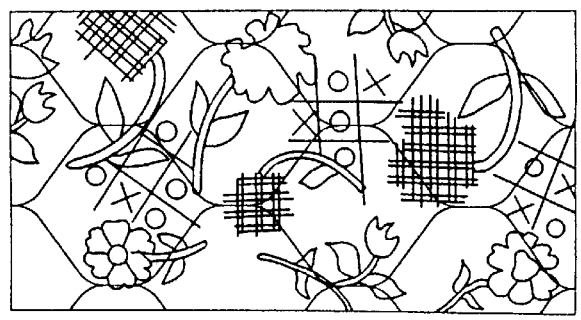
Figure 4F:
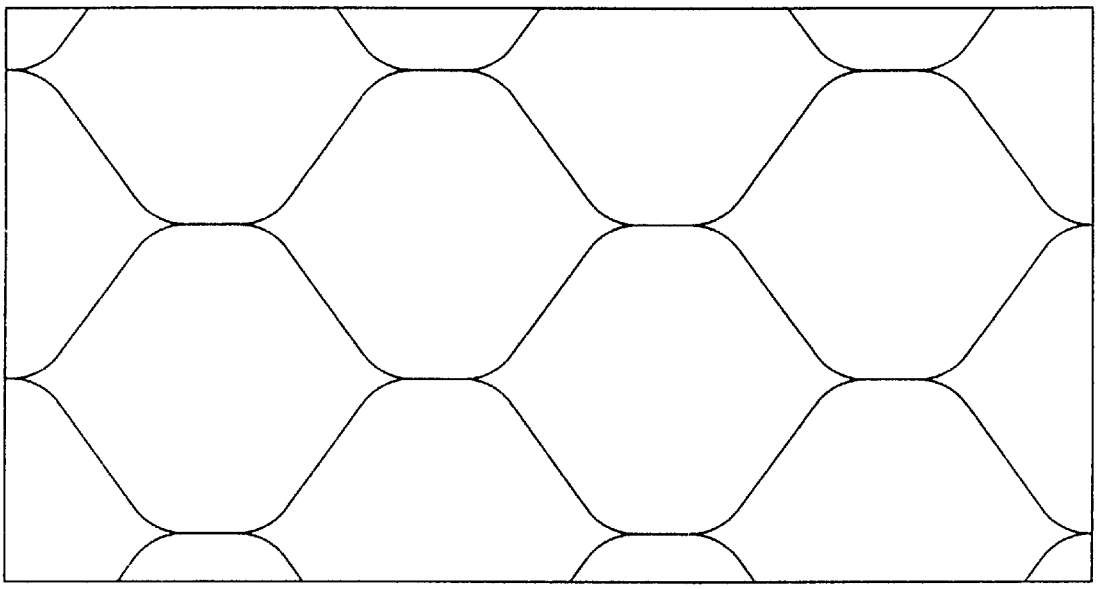
FIG. 4F depicts the resulting bump map acquired in accordance with the teaching of this invention.
Figure 4G:
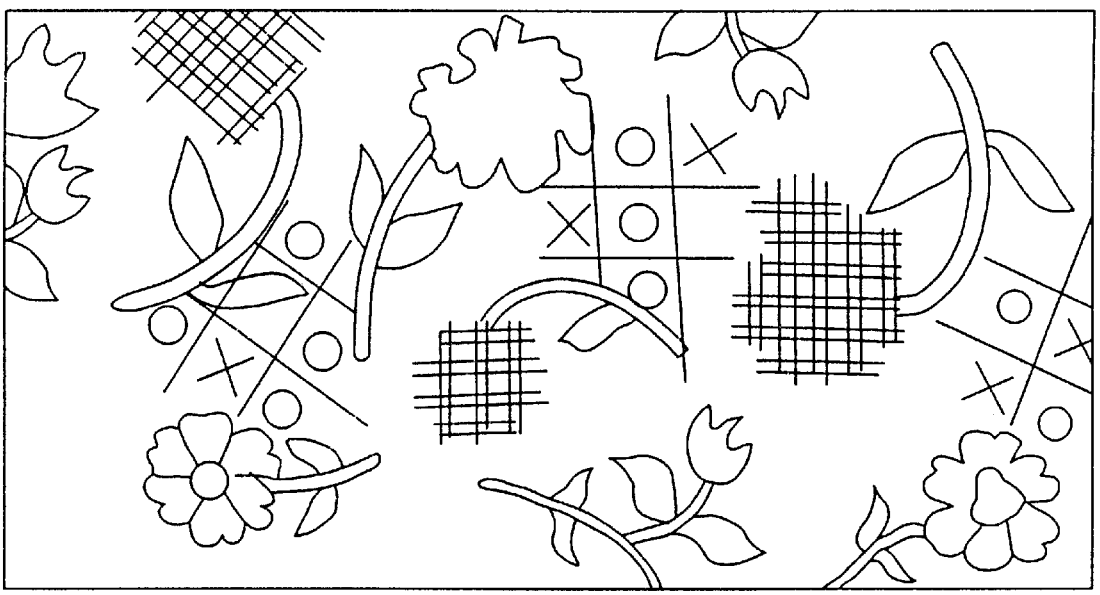
FIG. 4G depicts a corresponding relative reflectance map.

The images in FIGS. 4A–4E depict a portion of a quilted fabric captured with the five different light sources 131–135. The images are shown before scaling to account for the image taken from the center camera position being closer, and thus having overall higher pixel values. FIG. 4F shows the bump map computed from the image illuminated from a new direction and with a white reflectance. FIG. 4G shows the relative reflectance map.

Figure 6A:
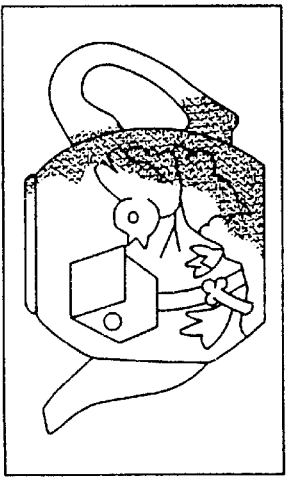
FIGS. 6A–6E depict the images 210–214 of FIG. 2 for a tea pot object having a surface relief design.
Figure 6B:
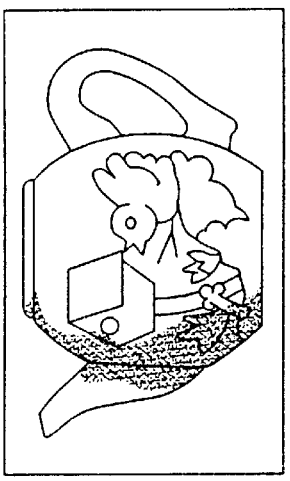
Figure 6C:
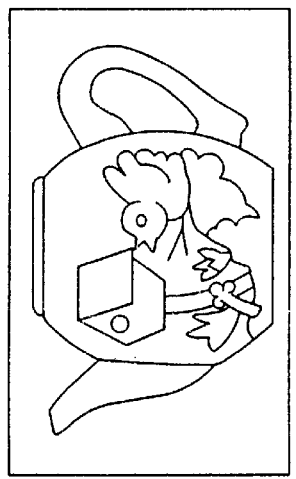
Figure 6D:
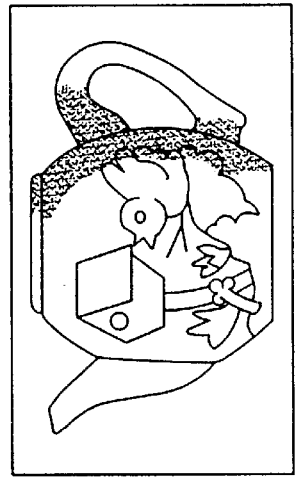
Figure 6E:
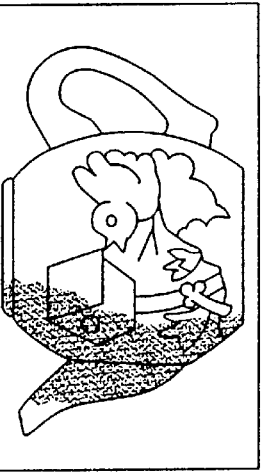

Further by example, FIGS. 6A–6E depict the images 210–214 for a tea pot object having a surface relief design. FIG. 6A corresponds to an image taken with the light source 133 in the upper left, FIG. 6B corresponds to an image taken with the light source 132 in the upper right, FIG. 6C corresponds to an image taken with the light source 131, FIG. 6D corresponds to an image taken with the light source 135 in the lower left, and FIG. 6E corresponds to an image taken with the light source 134 in the lower right. FIG. 7 illustrates the computed surface normal directions for original and smoothed (filtered) images. The top row of images correspond to the images 231, 232, 233. The values in the actual images are numbers ranging from −1 to +1. In order to display these images black has been assigned to −1 and white to +1. The image on the left is the x-component (left −1, right +1), the image in the center is the y component (down −1, up +1), and the image on the right is the z-component (into the page −1, out of the page +1). The second row of images in FIG. 7 corresponds to the images 241, 242, 243, that is, the low spatial frequency images.

The values in each of these images also vary from −1 to +1, and the left, center and right images again represent the components in the x, y and z directions, respectively. FIG.

Figure 8A:
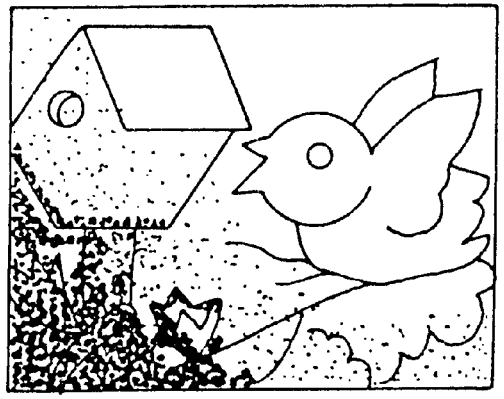
FIG. 8A is an example, for the case of FIGS. 6 and 7, of the images 231–233 of FIG. 2 that are computed from the surface normals.
Figure 8B:
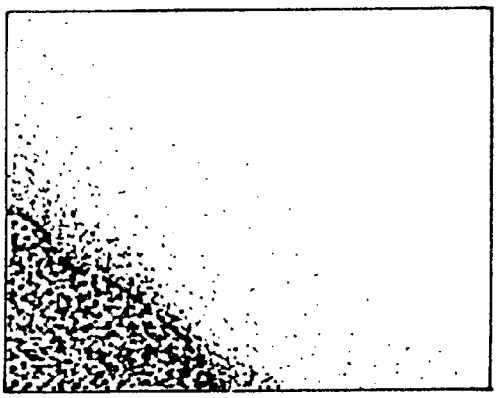
FIG. 8B is an example of the images 241–243 that result from low spatial frequency filtering step 240 of FIG. 2.
Figure 8C:
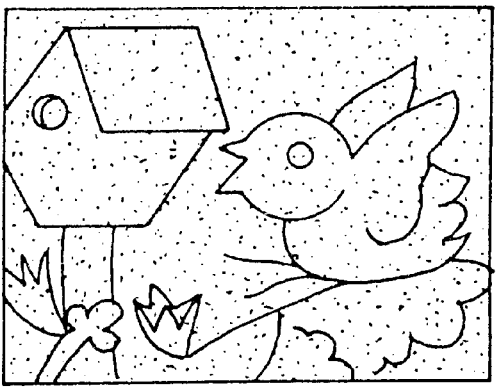
FIG. 8C is an example of the images 251–253 of FIG. 2 after the large scale object curvature is removed by the transformation and rotation step 250.
Figure 8D:
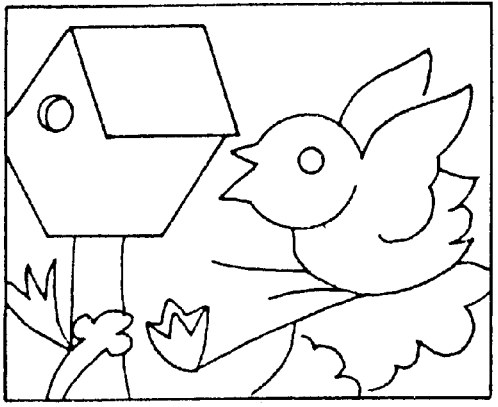
FIG. 8D is an example of the images 261–263 of FIG. 2 after being stretched to flatten the images.

8A is an example of the images 231–233 that are computed from the surface normals, FIG. 8B is an example of the images 241–243 that result from low spatial frequency filtering (blurring) step 240, and are indicative of the large scale object curvature, FIG. 8C is an example of the images 251–253 after the large scale object curvature is removed by the transformation and rotation step 250, and FIG. 8D is an example of the images 261–263 after being stretched to flatten the images.

It can be seen that the teachings of this invention enable the large scale curvature of the object 110 to be removed, leaving the bump map that is representative of the smaller scale surface features of interest.

While the invention has been particularly shown and described with respect to preferred embodiments thereof, it will be understood by those skilled in the art that changes in form and details may be made therein without departing from the scope and spirit of the invention.

What is claimed is:

1. A method for acquiring an image of small scale surface features of an object, comprising the steps of:
   successively illuminating the object with one of N light sources and, for each light source, obtaining a grey scale image of the object that is registered with the other grey scale images;
   processing the grey scale images such that for each corresponding pixel only N-X pixels are retained;
   forming N-X processed images having, for each image pixel, a computed surface normal;
   spatially filtering the N-X processed images to form N-X spatially filtered images of the processed images;
   transforming, using the N-X spatially filtered images, the surface normals of the processed images to form a set of N-X planar surface images; and
   generating from the set of N-X planar surface images a set of N-X final images having surface normals that represent the small scale surface features of the object that are substantially independent of object curvature.

2. A method as in claim 1, wherein N=5 and X=2.

3. A method as in claim 1, wherein the step of processing the grey scale images includes a step of, for each pixel, sorting the corresponding pixel values from each of the N images into a set of N pixel values; and discarding those pixel values that may represent specular highlights and shadows.

4. A method as in claim 3, wherein the step of discarding discards from each set of pixel values those pixel values having the greatest value and the least value.

5. A method as in claim 4, and further comprising a step of maintaining a record of light sources associated with the retained pixel values.

6. A method as in claim 5, wherein the computed surface normals are obtained using directions to the light sources corresponding to the retained pixels.

7. A system for acquiring an image of small scale surface features of an object, comprising:
   an imaging system for successively illuminating the object with one of N light sources and, for each light source, for obtaining a grey scale image of the object that is registered with the other grey scale images; and
   a data processor having an input coupled to an output of the imaging system for processing the grey scale images such that for each corresponding pixel only N-X pixels are retained; for forming N-X processed images having, for each image pixel, a computed surface normal; for spatially filtering the N-X processed images to form N-X spatially filtered images of the processed images; for transforming, using the N-X spatially filtered images, the surface normals of the processed images to form a set of N-X planar surface images; and for generating from the set of N-X planar surface images a set of N-X final images having surface normals that represent the small scale surface features of the object that are substantially independent of object curvature.

8. A system as in claim 7, wherein N=5 and X=2.

9. A system as in claim 7, wherein the data processor, when processing the grey scale images, operates for each pixel to sort the corresponding pixel values from each of the N images into a set of N pixel values and to discard those pixel values that may represent specular highlights and shadows.

10. A system as in claim 9, wherein the data processor discards from each set of pixel values those pixel values having the greatest value and the least value.

11. A system as in claim 10, wherein the data processor comprises a memory for storing record of light sources associated with retained pixel values.

12. A system as in claim 11, wherein the computed surface normals are obtained using directions to the light sources corresponding to the retained pixels.

13. A system as in claim 7, wherein one of the N light sources is located adjacent to a line of sight of the imaging system to the object, and wherein the other light sources are located away from the line of sight for each illuminating the object from a different direction.

14. A method for obtaining and processing acquired images of an object to extract a small scale geometry of the object, comprising steps of: operating N (where N>3) light sources and an image input device placed at a distance from the object such that different regions of the object are illuminated by each of the multiple light sources;
   obtaining multiple images of the object, one for each of the light sources with the other light sources turned off;
   processing the images to derive three images, each corresponding to a component of surface normals of the object relative to directions to three of the light sources;
   removing an effect of large scale surface shape from the derived images of the surface normals by computing low spatial frequency images from the derived images;
   for a section or sections of the images for which the small scale geometry is to be acquired, determining transformations from the surface normals represented by the low spatial frequency images to the normals of a planar surface;
   applying the transformations to the derived surface normal images to obtain the normals of the small scale surface variations applied to a flat plane;
   adjusting a spacing of the values for the normals to account for foreshortening due to curvature by expanding the distances using directional derivatives computed from the surface normals at each point in the image; and
   obtaining regularly spaced images of new surface normals by sampling the spatially adjusted images onto a new, regularly spaced image;
   whereby there is extracted the small scale geometry of the object that is substantially independent of the object's curvature.

15. A method as in claim 14, wherein there are five light sources.

16. A method as in claim 14, wherein the light sources are located a distance away from the object that is at least about five times the diameter of the object.

17. A method as in claim 14, wherein the extracted small scale geometry is applied to another object.

* * * * *